(12) United States Patent
Kim

(10) Patent No.: US 11,106,216 B2
(45) Date of Patent: Aug. 31, 2021

(54) SYSTEM AND METHOD FOR ASSISTING AUTONOMOUS DRIVING OF VEHICLE USING DRONE

(71) Applicants: HYUNDAI MOTOR COMPANY, Seoul (KR); KIA MOTORS CORPORATION, Seoul (KR)

(72) Inventor: Seung Hyun Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 387 days.

(21) Appl. No.: 16/168,436

(22) Filed: Oct. 23, 2018

(65) Prior Publication Data

US 2020/0033881 A1 Jan. 30, 2020

(30) Foreign Application Priority Data

Jul. 26, 2018 (KR) .................. 10-2018-0087348

(51) Int. Cl.
*G05D 1/02* (2020.01)
*G08G 1/01* (2006.01)
*B60K 31/00* (2006.01)

(52) U.S. Cl.
CPC ....... *G05D 1/0276* (2013.01); *B60K 31/0058* (2013.01); *G08G 1/012* (2013.01); *B64C 2201/126* (2013.01); *B64C 2201/127* (2013.01); *B64C 2201/145* (2013.01)

(58) Field of Classification Search
CPC .. G05D 1/0276; B60K 31/0058; G08G 1/012; B64C 2201/126; B64C 2201/127; B64C 2201/145
USPC .......................................................... 701/23
See application file for complete search history.

(56) References Cited

U.S. PATENT DOCUMENTS

| | | | |
|---|---|---|---|
| 10,467,685 B1* | 11/2019 | Brisson | B64F 1/222 |
| 10,739,153 B2* | 8/2020 | DeLuca | G01C 21/3605 |
| 2016/0016663 A1* | 1/2016 | Stanek | G05D 1/0094 |
| | | | 701/3 |
| 2017/0160735 A1* | 6/2017 | Mikan | G08G 5/0034 |
| 2017/0195038 A1* | 7/2017 | Sham | H04W 72/04 |
| 2018/0157258 A1* | 6/2018 | O'Brien | G05D 1/0088 |
| 2018/0186473 A1* | 7/2018 | Erickson | G06Q 30/08 |
| 2019/0061688 A1* | 2/2019 | Watanabe | B60R 25/241 |
| 2019/0066503 A1* | 2/2019 | Li | G08G 5/045 |
| 2019/0086222 A1* | 3/2019 | Arakawa | G01C 21/3438 |
| 2019/0132720 A1* | 5/2019 | Mizutani | B60L 53/14 |
| 2019/0197890 A1* | 6/2019 | Du | G08B 5/00 |
| 2019/0227555 A1* | 7/2019 | Sun | G05D 1/0212 |
| 2020/0019186 A1* | 1/2020 | Ichien | G05D 1/0088 |
| 2020/0032484 A1* | 1/2020 | O'Donnell | E02F 9/205 |

* cited by examiner

*Primary Examiner* — Krishnan Ramesh
(74) *Attorney, Agent, or Firm* — Morgan, Lewis & Bockius LLP

(57) ABSTRACT

A system assisting autonomous driving using a drone include: a drone obtaining peripheral information through at least one or more detectors; a vehicle performing autonomous driving by using the peripheral information; and a server lending the drone in response to a drone rental request of the vehicle and assisting the autonomous driving of the vehicle.

20 Claims, 5 Drawing Sheets

SYSTEM AND METHOD FOR ASSISTING AUTONOMOUS DRIVING OF VEHICLE USING DRONE

CROSS-REFERENCE TO RELATED APPLICATION

This application is based on and claims the benefit of priority to Korean Patent Application No. 10-2018-0087348, filed on Jul. 26, 2018, in the Korean Intellectual Property Office, the disclosure of which is incorporated herein in its entirety by reference.

TECHNICAL FIELD

The present disclosure relates to a system and a method for assisting autonomous driving using a drone that assist autonomous driving through drone rental in a desired situation.

BACKGROUND

With the development of Information Technology (IT), vehicles equipped with an autonomous driving function, services operating in conjunction with an autonomous driving system, and infrastructures operating in conjunction with the autonomous driving system are increasing. However, it is difficult to apply the autonomous driving system to various vehicles such as small cars, trucks, and the like because of cost burden of a camera, a radar, a controller, and the like which are essential elements of the autonomous driving system. Since the controller, the camera, the radar, and the like are always mounted even when a user does not utilizes the autonomous driving system very often, a vehicle to which the autonomous driving system is applied is inefficient.

When the camera, the radar, and the controller installed in the vehicle have a failure, it is difficult to maintain the vehicle because it is necessary to visit the service center for the purpose of inspecting the vehicle. In addition, accidents may occur during autonomous driving, when the sensing error of a camera or radar occurs due to a dust and a foreign object or due to scratch damage during car wash.

SUMMARY

The present disclosure has been made to solve the above-mentioned problems occurring in the prior art while advantages achieved by the prior art are maintained intact.

An aspect of the present disclosure provides a system and a method for assisting autonomous driving using a drone that rent the drone equipped with a sensing means such as a camera, a radar, and the like and assist the autonomous driving through the interlock between the drone and the autonomous driving system in a vehicle.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a system for assisting autonomous driving using a drone may include: a drone obtaining peripheral information through at least one or more detectors; a vehicle performing the autonomous driving by using the peripheral information; and a server lending the drone in response to a drone rental request of the vehicle and assisting the autonomous driving of the vehicle.

Each of the at least one or more detectors may be composed of at least one or more of a camera and a radar.

The server may determine whether communication with the drone of the vehicle is possible and whether an autonomous driving function is mounted, to determine drone service use permission, when receiving the drone rental request of the vehicle.

The server may transmit location information of the vehicle to the drone, when lending the drone.

The drone may move to a location of the vehicle under control of the server.

The drone may include a communication device for wireless communication between the vehicle and the server, a Global Positioning System (GPS) receiver detecting location information of the drone, a gyro sensor detecting angle information of the detector, and a processor correcting the peripheral information detected by the detector, based on the location information of the drone and the angle information of the detector.

The vehicle may determine whether a detector mounted in the drone is abnormal and requests the server to rent another drone again depending on the determination result.

The vehicle may determine whether to terminate drone service use, in response to a user input when the autonomous driving is terminated.

The vehicle may make a request for drone retrieval to the server, when it is determined that the drone service use is terminated.

The server may transmit a return location to the drone in response to the request for the drone retrieval of the vehicle.

According to another embodiment of the present disclosure, a vehicle may include: a communication device wirelessly communicating between a server and a drone; a detector detecting vehicle state information, and a processor configured to make a request for drone rental to the server to rent the drone, to obtain peripheral information through at least one or more detectors mounted in the drone, and to perform autonomous driving based on the obtained peripheral information and the vehicle state information.

According to still another embodiment of the present disclosure, a method for assisting autonomous driving using a drone may include: making, by a vehicle, a request for drone service use to a server; determining, by the server, whether the drone service use of the vehicle is possible; making, by the vehicle, a request for drone rental to the server depending on the determination result of the server; lending, by the server, a drone in response to the request of the vehicle; moving the drone to a location of the vehicle under control of the server; and performing, by the vehicle, autonomous driving based on peripheral information obtained through at least one or more detectors mounted in the drone.

The detector may be composed of at least one or more of a camera and a radar.

The determining of whether the drone service use of the vehicle is possible may include determining whether the vehicle is capable of communicating with the drone and whether the vehicle mounts an autonomous driving function.

The drone may correct information obtained by the at least one or more detectors based on location information of the drone and angle information of the at least one or more detectors, in the performing of the autonomous driving.

The vehicle may determine whether the at least one or more detectors mounted in the drone are abnormal, in the performing of the autonomous driving.

The vehicle may request the server to lend a drone again when at least one or more among the at least one or more detectors are abnormal, in the performing of the autonomous driving.

The method may further include determining, by the vehicle, whether to terminate the autonomous driving, determining, by the vehicle, whether the drone service use is terminated, depending on whether the autonomous driving is terminated, making a request for drone retrieval to the server depending on whether the autonomous driving is terminated, and controlling, by the server, return of the drone, After the performing of the autonomous driving.

The server may transmit return location to the drone, when the server causes the drone to return, in the controlling of the return of the drone.

The vehicle may wirelessly communicate between the drone and the server.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
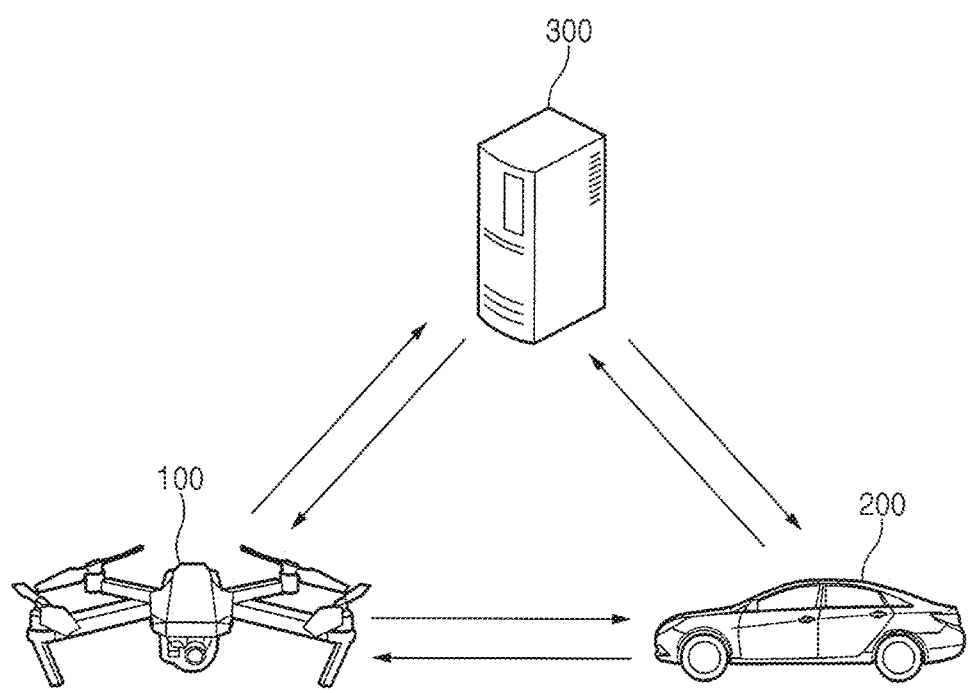
FIG. 1 illustrates a block diagram of a system assisting autonomous driving using a drone, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, "A", "B", (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 illustrates a block diagram of a system assisting autonomous driving using a drone, according to an embodiment of the present disclosure.

As illustrated in FIG. 1, according to an embodiment of the present disclosure, a system assisting autonomous driving using a drone may include a drone 100, a vehicle 200, and a server 300.

The drone 100 may have at least one or more detectors (sensors). The drone 100 may move a location where the vehicle 200 renting the drone 100 is located, under control of the server 300. The drone 100 obtains peripheral information of the corresponding vehicle 200 through the at least one or more detectors. The drone 100 provides the obtained peripheral information to the vehicle 200.

The vehicle 200 rents the drone 100 through the server 300. The vehicle 200 performs autonomous driving by using the peripheral information from the rented drone 100. The vehicle 200 requests retrieval of the drone 100, when the autonomous driving is terminated.

The server 300 may manage at least one or more drones 100. The server 300 stores and manages identification information, state information (e.g., whether the drone 100 fails), rental information (e.g., whether the drone 100 is rented, rental time, a lender, a vehicle that rents the drone 100, rental fee, and the like) of each of the drones 100, state information (e.g., whether a detector is contaminated, whether a detector fails, or the like) of each of the detectors, and the like in the form of a database (DB).

The server 300 lends one of the at least one or more drones 100 held by the server 300, in response to the request for drone rental of the vehicle 200. At this time, the server 300 may lend the two or more drones 100 at the request of the vehicle 200.

The server 300 may move the lent drone 100 to a retrieval location (a return location), in response to the request for drone retrieval (a request for returning the drone) of the vehicle 200.

Such the server 300 may include a processor, a memory, and a communication device. The processor may include at least one or more of an Application Specific Integrated Circuit (ASIC), a Digital Signal Processor (DSP), a Programmable Logic Devices (PLD), Field Programmable Gate Arrays (FPGAs), a Central Processing Unit (CPU), microcontrollers, and microprocessors. The memory may be implemented with one or more storage media such as a Random Access Memory (RAM), a Read Only Memory (ROM), a register, and the like. The communication device may allow the server 300 to communicate with the drone 100 and the vehicle 200 wirelessly. The communication device utilizes a communication technology such as wireless Internet, short range communication, and/or mobile communication. Herein, Wireless LAN (WLAN) (Wi-Fi), Wireless broadband (Wibro), World Interoperability for Microwave Access (Wimax), and the like may be used as a wireless Internet technology. Bluetooth, Near Field Communication (NFC), Radio Frequency Identification (RFID), Infrared Data Association (IrDA), Ultra-Wideband (UWB), ZigBee, or the like may be used as the short range communication technology. Code Division Multiple Access (CDMA), Global System for Mobile communication (GSM), Long Term Evolution (LTE), LTE-Advanced (LTE-A), and the like may be used as the mobile communication technology.

Figure 2:
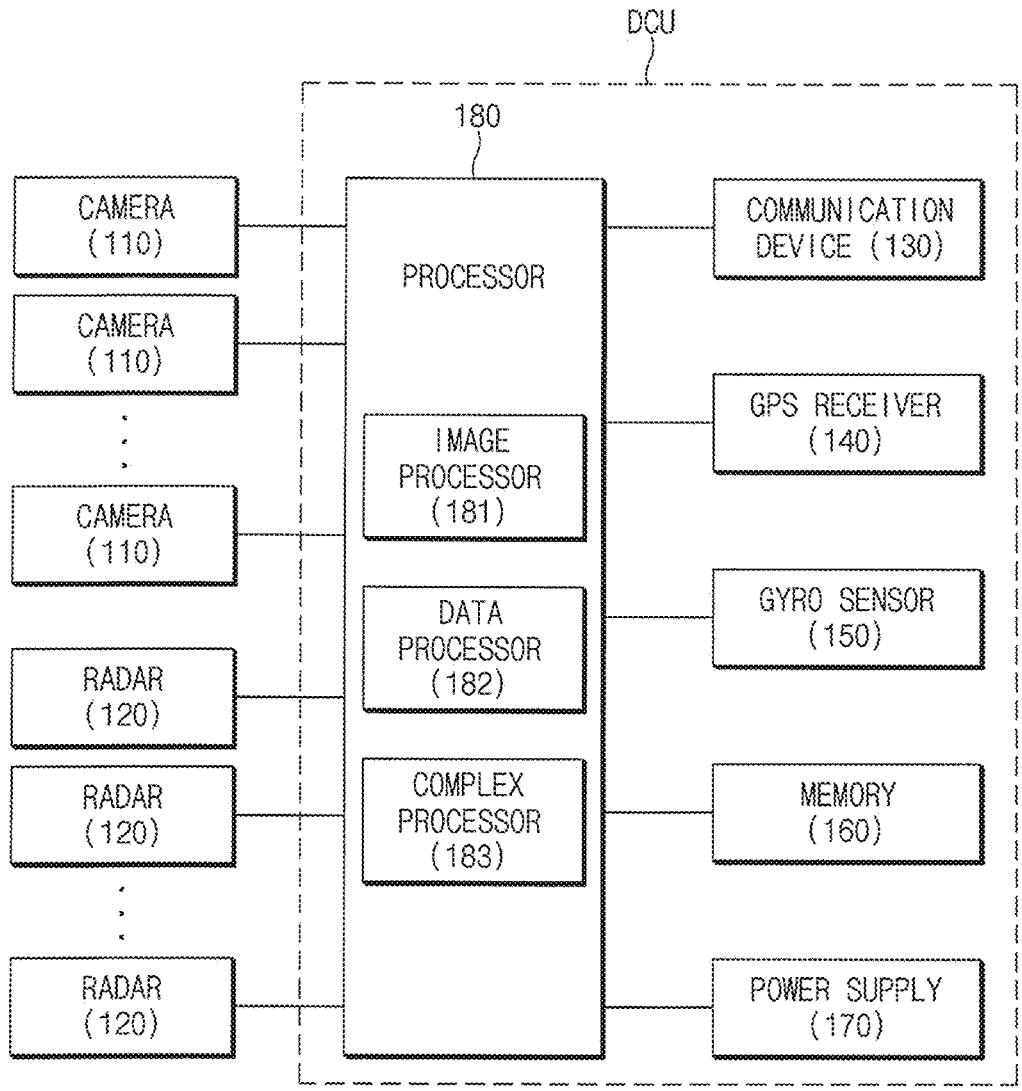
FIG. 2 is a block diagram of a drone illustrated in FIG. 1.

FIG. 2 illustrates a block diagram of the drone 100 illustrated in FIG. 1.

Referring to FIG. 2, the drone 100 includes a camera 110, a Radio Detecting And Ranging (radar) 120, a communication device 130, a Global Positioning System (GPS) receiver 140, a gyro sensor 150, a memory 160, a power supply 170, and a processor 180. Herein, the communication device 130, the GPS receiver 140, the gyro sensor 150, the memory 160, the power supply 170, and the processor 180 are collectively referred to as a drone control unit (DCU).

The camera 110 may be mounted in the drone 100 so as to obtain image information. The camera 110 may be provided in plural. For example, the cameras 110 may be installed on the rear surface of the drone 100, and/or the cameras 110 may be installed on the front side, the rear side, the right side, and the left side of the drone 100, respectively. The camera 110 may be implemented with at least one or more image sensors among image sensors such as a charge coupled device (CCD) image sensor, a complementary metal oxide semi-conductor (CMOS) image sensor, a charge priming device (CPD) image sensor, a charge injection device (CID) image sensor, and the like. The camera 110 may include at least one or more lenses among lenses such as a standard lens, an ultra-wide angle lens, a wide-angle lens, a zoom lens, a macro lens, a telephoto lens, a fisheye lens and a quasi-fisheye lens. The camera 110 may include a device capable of adjusting the angle (lens angle) of each of the cameras 110.

The camera 110 may be connected to the processor 180 via a Low Voltage Differential Signal (LVDS) cable or an Ethernet cable. The camera 110 transmits the obtained image raw data to the processor 180.

The radar 120 may emit electromagnetic waves to a surrounding object, may receive electromagnetic waves reflected from the surrounding object, and may verify the distance from the surrounding object, the direction to the surrounding object, and the altitude of the surrounding object. At least one or more radars 120 may be installed on the front side of the drone 100, may be installed on the rear side of the drone 100, may be installed on the right side of the drone 100, and/or may be installed on the left side of the drone 100.

The radar 120 may communicate with the processor 180 by using a communication technology such as Controller Area Network (CAN), X-by-Wire (Flexray), or the like. The radar 120 transmits the sensed (measured) radar raw data to the processor 180.

The communication device 130 is a hardware device and wirelessly communicates with the vehicle 200 and the server 300 by using wireless Internet, short range communication, and/or mobile communication. Herein, WLAN (Wi-Fi), Wibro, Wimax, and the like may be used as a wireless Internet technology. Bluetooth, NFC, RFID, IrDA, UWB, ZigBee, or the like may be used as the short range communication technology. CDMA, GSM, LTE, LTE-A, and the like may be used as the mobile communication technology.

The GPS receiver 140 measures a current location of the drone 100. The GPS receiver 140 is a device that is capable of receiving information from GPS satellites and calculates the current location of the drone 100 by using a signal from the GPS satellites.

The gyro sensor 150 measures the azimuthal change of the drone 100. That is, the gyro sensor 150 measures the angular velocity of the drone 100. The gyro sensor 150 may be replaced with a gyroscope.

The memory 160 may store software for controlling the overall operation of the drone 100, an image processing algorithm, a radar data processing algorithm, an algorithm for processing and computing image and radar data, a correction algorithm, and the like. The memory 160 may temporarily store input data and/or output data of the processor 180. Furthermore, the memory 160 may store an image obtained through the camera 110 and radar data measured by the radar 120.

The memory 160 may be implemented with at least one or more storage media (recording media) among a flash memory, a hard disk, a Secure Digital (SD) card, a RAM, a ROM, an Electrically Erasable and Programmable ROM (EEPROM), an Erasable and Programmable ROM (EPROM), a register, a removable disc, web storage, and the like.

The power supply 170 supplies power necessary to operate each of the components mounted on the drone 100. The power supply 170 receives power from a battery, a fuel cell, or the like mounted in the drone 100 and then supplies the power to each of the components. In the present disclosure, the power supply 170 is an electrical device that supplies electric power to an electrical load.

The processor 180 controls the overall operation of the drone 100. For example, the processor 180 may control the flight of the drone 100 depending on the control command from a remote controller. The remote controller may be implemented in the server 300 or may be implemented independently of the server 300. Such a processor 180 may include at least one or more of an ASIC, a DSP, a PLD, FPGAs, a CPU, micro-controllers, and microprocessors.

The processor 180 receives a location (a rental vehicle location) of a vehicle that will rent the drone 100, from the server 300 through the communication device 130. The processor 180 may move the drone 100 to the received rental vehicle location. At this time, the processor 180 controls the flight controller (not illustrated) to move the drone 100 to the rental vehicle location.

The processor 180 lands and mounts the drones 100 on the vehicle 200, when the current location of the drone 100 is matched to the rental vehicle location. The processor 180 makes a communication connection to the vehicle 200 after the drone 100 is mounted on the vehicle 200.

The processor 180 obtains peripheral information of the vehicle 200 through the camera 110 and the radar 120, when the communication connection to the vehicle 200 is successful. That is, the processor 180 obtains peripheral image information of the vehicle 200 through the camera 110 and obtains peripheral object information of the vehicle 200 through the radar 120.

Such the processor 180 includes an image processor 181, a data processor 182, and a complex processor 183.

The image processor 181 performs image processing, such as noise elimination, distortion correction, color reproduction, adjustment of image quality and saturation, file compression, and the like, on the image obtained by the camera 110. The image processor 181 may also be implemented with a separate image processing processor.

The image processor 181 corrects the image obtained by the camera 110, based on drone location information and camera angle information, which are obtained through the GPS receiver 140 and the gyro sensor 150. The image processor 181 obtains a front view image, a rear view image, and a side view image through the front view camera 110, the rear view camera 110, and the side view camera 110 and corrects the obtained images, respectively.

The data processor 182 performs data processing, for example, noise cancellation or the like, on radar data (radar raw data) sensed by the radar 120. The data processor 182 corrects the obtained radar data based on drone location information and radar angle information, which are obtained through the GPS receiver 140 and the gyro sensor 150. The data processor 182 obtains pieces of multi-directional radar data (front view data, rear view data, and side view data) through the plurality of radars 120 and corrects each of the obtained pieces of radar data.

The complex processor 183 may merge pieces of image information corrected by the image processor 181 to generate a piece of image information. For example, the complex processor 183 may generate one image by using the corrected front view image, the corrected rear view image, and the corrected side view image.

The complex processor 183 may merge the corrected front view radar data, the corrected rear view radar data, and the corrected side view radar data, which are transmitted from the data processor 182, to generate a piece of radar information.

The complex processor 183 generates the final image information and the final radar information, by using the merged image information and the merged radar information. The complex processor 183 generates a packet (transmission data) depending on a communication protocol for the purpose of transmitting the final image information and the final radar information to the vehicle 200 through the communication device 130. The complex processor 183 transmits the final image information and the final radar information to the vehicle 200 through the communication device 130.

In the present disclosure, the image processor 181, the data processor 182, and the complex processor 183 may be embedded into the processor 180 as one device.

An embodiment is exemplified as controlling the flight of the drone 100 through a remote controller. However, an embodiment of the present disclosure is not limited thereto. For example, the drone 100 may be implemented to perform autonomous flight.

Figure 3:
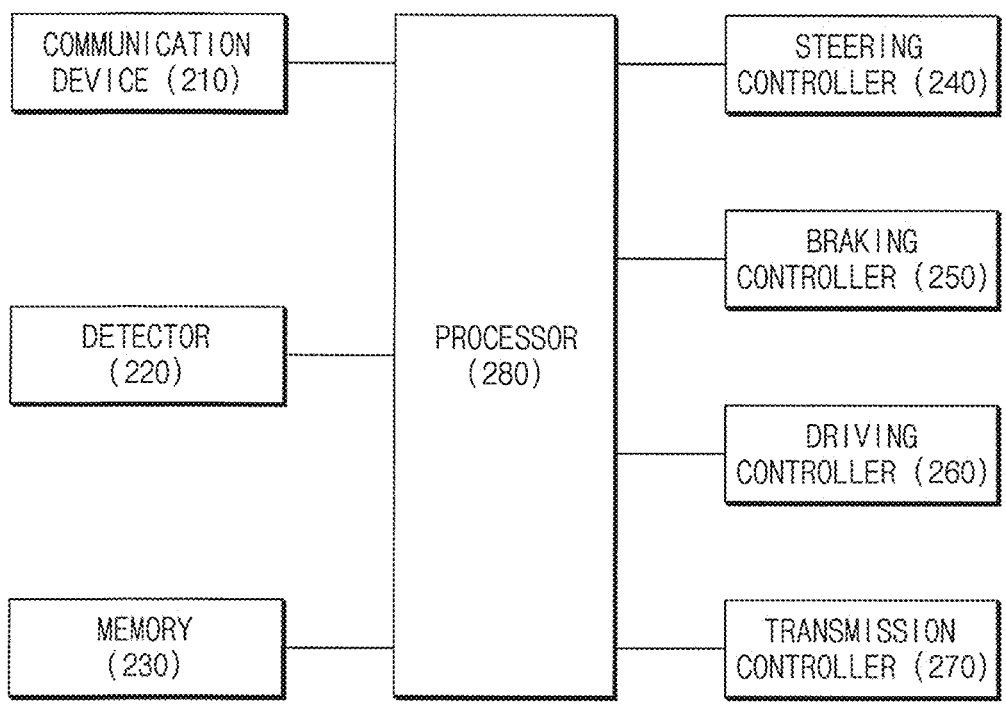
FIG. 3 is a block diagram of a vehicle illustrated in FIG. 1.

FIG. 3 illustrates a block diagram of the vehicle 200 illustrated in FIG. 1.

The vehicle 200 includes a communication device 210, a detector 220, a memory 230, a steering controller 240, a braking controller 250, a driving controller 260, a transmission controller 270, and a processor 280.

The communication device 210 may communicate with the drone 100 and the server 300 wirelessly. Wireless Internet, short range communication, and/or mobile communication may be used as a wireless communication technology. The communication device 210 receives peripheral information of the vehicle 200 from the drone 100. The communication device 210 may transmit, to the server 300, a message for making (applying) a request for drone rental and drone return (retrieval).

The detector 220 obtains vehicle state information from various sensors and/or ECUs, which are mounted in the vehicle 200. The various sensors may include a steering angle sensor, a shock sensor, a speed sensor, an acceleration sensor, and the like. The detector 220 obtains vehicle information (e.g., a vehicle position, a braking status, or the like) from the ECUs such as an airbag system, a vehicle door system, an electronic stability control (ESC), a traction control system (TCS), an antilock brake system (ABS), and the like through the vehicle network. The vehicle network may be implemented by using a communication technology such as Controller Area Network (CAN), Media Oriented Systems Transport (MOST) network, Local Interconnect Network (LIN), and/or X-by-Wire (Flexray).

The memory 230 stores software programmed for the processor 280 to perform specified operations, a navigation program, an autonomous driving control algorithm (program), and the like. The memory 230 may store input data and/or output data of the processor 280. Furthermore, the memory 230 may store data (information) received through the communication device 210, vehicle state information obtained through the detector 220, map data, and the like.

The memory 230 may be implemented with at least one or more storage media (recording media) among a flash memory, a hard disk, an SD card, a RAM, a ROM, an EEPROM, an EPROM, a register, a removable disc, web storage, and the like.

The steering controller 240 may be implemented with a Motor Drive Power Steering (MDPS), as an actuator that controls the steering of the vehicle.

The braking controller 250 may be implemented with an Electronic Stability Control (ESC), as an actuator that controls the deceleration of the vehicle 200. The braking controller 250 adjusts the braking pressure for the purpose of following the target speed requested by the processor 280 during autonomous driving.

The driving controller 260 controls the acceleration of the vehicle 200, as an actuator that controls an engine of the vehicle 200. The driving controller 260 may be implemented with an Engine Management System (EMS). The driving controller 260 controls the driving torque of an engine depending on accelerator pedal location information output from an accelerator pedal location sensor. The driving controller 260 controls the output of the engine for the purpose of following the driving speed of the vehicle 200 requested by the processor 280 during autonomous driving (a smart cruise control (SCC) system is turned on).

The transmission controller 270 may be implemented with a Shift-By-Wire (SBW), as an actuator for controlling the transmission (shift) of the vehicle 200. The transmission controller 270 controls the gear shift of the vehicle 200 depending on a gear location and a gear state range.

In addition, the vehicle 200 may include a body controller that controls a window, an air conditioning and heating system, an immobilizer system, and the like.

In the present disclosure, each of the steering controller 240, the braking controller 250, the driving controller 260, and the transmission controller 270 may be an electronic control unit (ECU) or may be embedded in one ECU for controlling various electric systems as described above.

The processor 280 may make a request for drone service use to the server 300 through the communication device 210. The processor 280 may make a request for drone rental to the server 300 depending on whether the server 300 accepts the drone service use. In other words, the processor 280 may make a request for the drone rental, when the server 300 accepts the drone service use. The server 300 determines whether the vehicle 200 is capable of communicating with the drone 100 and whether the vehicle 200 mounts an autonomous driving function, and then determines the approval of the drone service use depending on the determination result.

The processor 280 sets a communication connection to the communication device 130 of the drone 100 through the communication device 210, when the rented drone 100 is landed on (arrives at) the vehicle 200 and then is mounted on the vehicle 200 after making a request for the drone rental. After setting the communication connection, the processor 280 checks whether or not the camera 110 and the radar 120 of the drone 100 are abnormal.

The processor 280 waits for autonomous driving when the camera 110 and the radar 120 of the drone 100 are normal. In the meantime, the processor 280 makes a request for the rental of the new drone 100 to the server 300, when the camera 110 and the radar 120 of the drone 100 are abnormal. An embodiment is exemplified as the vehicle 200 determines whether or not the camera 110 and the radar 120, which are mounted in the drone 100, are abnormal after the rented drone 100 is normally mounted in the vehicle 200.

However, an embodiment of the present disclosure is not limited thereto. For example, the server 300 may be implemented to lend the drone 100 after the server 300 determines that the camera 110 and the radar 120, which are mounted in the drone 100, are normal.

The processor 280 operates the autonomous driving function and then enters an autonomous driving mode, when the vehicle 200 starts driving. The processor 280 performs the autonomous driving of the vehicle 200 based on peripheral information obtained through the camera 110 and the radar 120 of the drone 100 and vehicle state information obtained through the detector 220. In other words, the processor 280 controls at least one or more of the steering controller 240, the braking controller 250, the driving controller 260, and the transmission controller 270, based on the obtained peripheral information and the obtained vehicle information.

The processor 280 notifies a driver whether to terminate drone use, when the autonomous driving is terminated. The driver manipulates a user interface (not illustrated) to enter data associated with whether drone use is terminated, and the processor 280 may determine whether the drone use is terminated, based on the data input from the user interface (not illustrated). The processor 280 makes a request for drone retrieval to the server 300, when it is determined that the drone use is terminated. The processor 280 may make a request for the extension of drone use to the server 300 when the driver desires to continuously use the drone 100.

Figure 4:
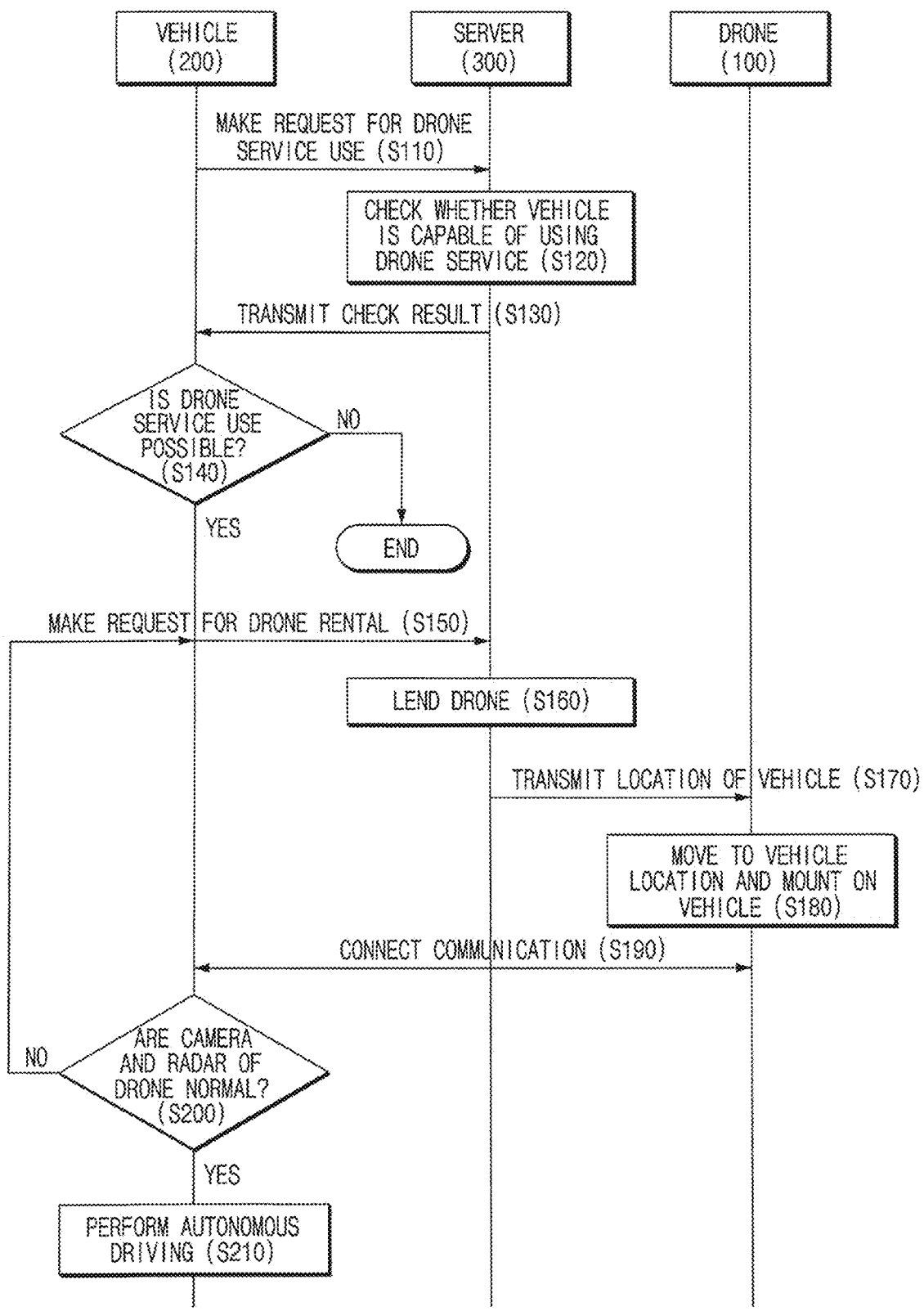
FIG. 4 is a flowchart illustrating a method of assisting autonomous driving using a drone, according to an embodiment of the present disclosure.

FIG. 4 is a flowchart illustrating a method of assisting autonomous driving using a drone, according to an embodiment of the present disclosure.

Referring to FIG. 4, in operation S110, the vehicle 200 makes a request for drone service use to the server 300. The vehicle 200 transmits vehicle information to the server 300 when making a request for the drone service use. The vehicle information includes vehicle identification number, a vehicle number, the type of a vehicle, communication capable of being used by a vehicle, whether an autonomous driving function is mounted, and the like.

In operation S120, the server 300 checks whether the vehicle 200 is capable of using a drone service, at the request of the vehicle 200. The server 300 determines whether the vehicle 200 is capable of communicating with the drone 100 and whether the vehicle 200 mounts the autonomous driving function, to determine the approval (permission) of the drone service use. In other words, the server 300 may permit the drone service use when the vehicle 200 is capable of communicating with the drone 100 and mounts an autonomous driving function. The server 300 may not permit the drone service use, when the vehicle 200 is not capable of communicating with the drone 100 or does not mount an autonomous driving function, or when the vehicle 200 is not capable of communicating with the drone 100 and does not mount an autonomous driving function.

In operation S130, the server 300 transmits the check result obtained by checking whether the drone service use is possible, to the vehicle 200. In other words, the server 300 transmits a notification that the drone service use is permitted (approved) or a notification that the drone service use is not permitted.

In operation S140 and operation S150, the vehicle 200 makes a request for drone rental to the server 300, when the received check result indicates that the drone service use is possible. The vehicle 200 transmits a drone rental request message including information such as a desired duration of drone use, a drone type.

In operation S160, the server 300 lends one of the owned drones 100, in response to the request for drone rental of the vehicle 200. At this time, the server 300 may transmit information (e.g., drone identification information, the number of mounted cameras, the number of mounted radars, or the like) about the rented drone 100 to the vehicle 200.

In operation S170, the server 300 transmits the location (a rental vehicle location) of a vehicle, which rents the drone 100, to the rented drone 100.

In operation S180, the drone 100 moves to the rental vehicle location and is mounted in the corresponding vehicle 200. Since the drone 100 makes or releases a vacuum state between the body surface of the vehicle 200 and the suction plate mounted on the drone 100, the drone 100 may include a vacuum device that is detachable to the body surface of the vehicle 200.

In operation S190, the vehicle 200 sets a connection for communication with the drone 100, when the drone 100 is reached. In other words, the vehicle 200 and the drone 100 perform a connection procedure for communication between each other.

After the communication with the drone 100 is connected, in operation S200, the vehicle 200 determines whether or not the camera 110 and the radar 120 mounted in the drone 100 are abnormal. The vehicle 200 determines whether or not the camera 110 and the radar 120 are abnormal, by using the test algorithm stored in the memory 230.

In operation S210, the vehicle 200 performs autonomous driving, when the camera 110 and the radar 120 mounted in the drone 100 are normal. The vehicle 200 controls the autonomous driving by using peripheral information obtained through the camera 110 and the radar 120, which are mounted in the drone 100, and vehicle state information obtained from various sensors and ECUs mounted in the vehicle 200.

The vehicle 200 returns to operation S150 and then makes a request for new drone rental to the server 300 to rent the new drone 100, when the camera 110 and the radar 120 mounted in the drone 100 are abnormal. The vehicle 200 transmits, to the server 300, the reason why the vehicle 200 requests the server 300 to rent the drone 100 again, when the vehicle 200 requests the server 300 to rent the drone 100 again due to the abnormality of the camera 110 and/or the radar 120 of the rented drone 100.

Figure 5:
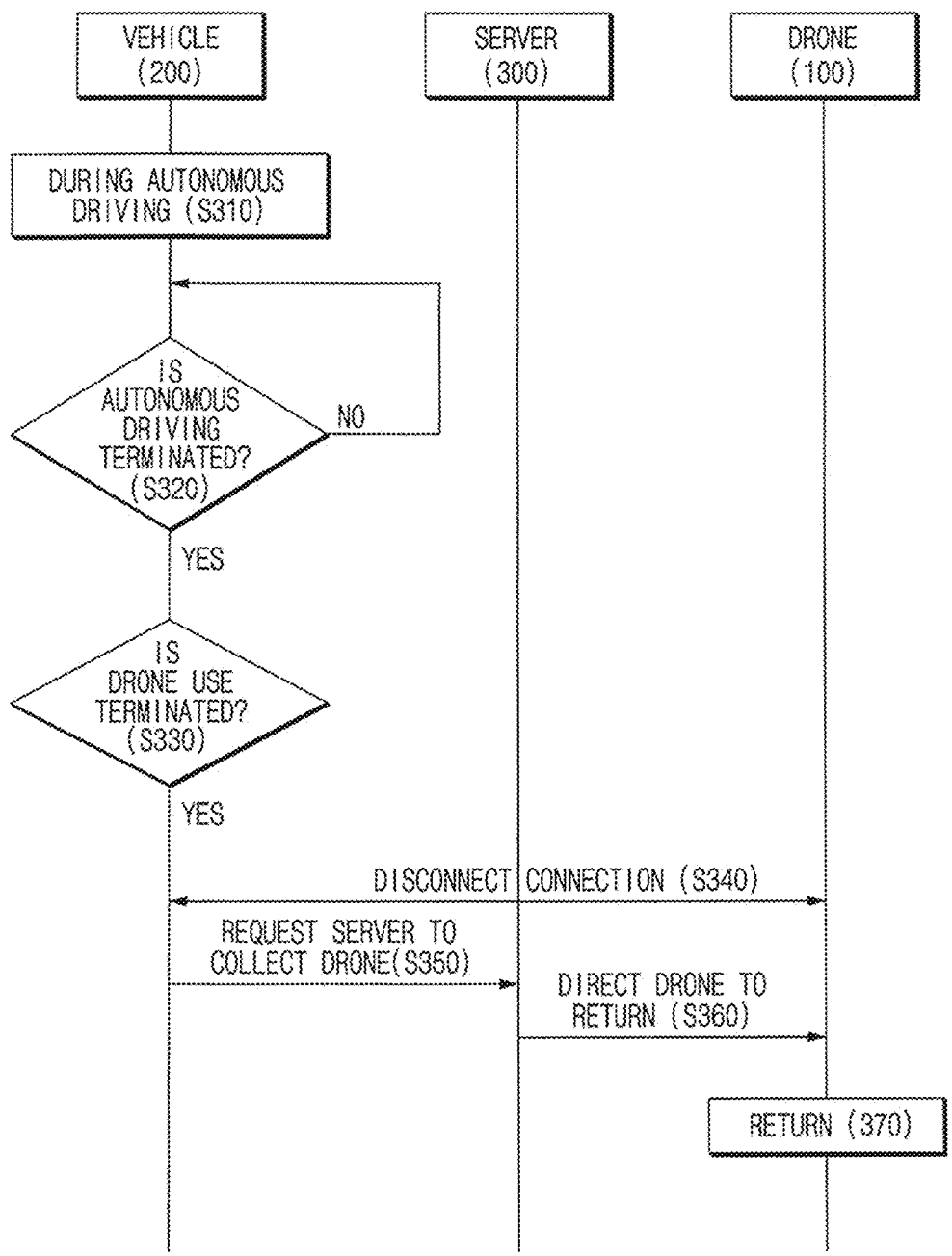
FIG. 5 a flowchart illustrating a process of terminating a drone service, according to an embodiment of the present disclosure.

FIG. 5 a flowchart illustrating a process of terminating a drone service, according to an embodiment of the present disclosure.

In operation S310 and operation S320, the vehicle 200 determines whether to terminate autonomous driving, while performing the autonomous driving. The vehicle 200 determines to terminate the autonomous driving, when the vehicle 200 arrives at the destination set in a navigation terminal or when a command to terminate the autonomous driving is entered by a driver.

In operation S330, the vehicle 200 determines whether drone use is terminated, when the autonomous driving is terminated. The vehicle 200 outputs a notification that the autonomous driving is terminated, and then determines whether to terminate drone use, in response to a user input, when the autonomous driving is terminated.

The vehicle 200 disconnects communication connection to the drone 100, when it is verified that the drone use is terminated. In operation S350, the vehicle 200 requests the server 300 to collect the drone 100.

In operation S360, the server 300 directs the rented drone 100 to return, when receiving a request for drone retrieval to the vehicle 200. The server 300 may provide the drone 100 with information about a return location (a retrieval location), when directing the rented drone 100 to return. In the meantime, the information about the return location may be stored in the memory 160 of the drone 100.

In operation S370, the drone 100 moves to the return location depending on the return instruction of the server 300. The drone 100 may transmit, to the server 300, a notification that the drone 100 moves to the return location, when the drone 100 arrives at the return location. The server 300 may notify the vehicle 200 that the drone 100 moves to the return location, when it is verified that the drone 100 moves to the return location.

The present disclosure may rent a drone equipped with a sensing means such as a camera, a radar, and the like and may assist the autonomous driving through the interlock between the drone and the autonomous driving system in a vehicle, and thus may assist autonomous driving of various vehicles without limitations of vehicle types and vehicle classes.

In addition, the present disclosure uses a sensing means mounted in the drone only when the vehicle is in autonomous driving. Accordingly, it is not necessary to mount the sensing means such as a camera, a radar, and the like in the vehicle, thereby reducing the unit cost of the vehicle.

Furthermore, a drone rental company may maintain the sensing means such as a camera, a radar, and the like mounted in the drone, thereby providing a driver with convenience.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A system for assisting autonomous driving using a drone, the system comprising:
    a drone configured to obtain peripheral information through at least one or more detectors;
    a vehicle configured to perform the autonomous driving by using the peripheral information; and
    a server configured to:
        determine whether drone service use of the vehicle is possible in response to a request for the drone service use of the vehicle, and
        lend the drone in response to a request for drone rental of the vehicle to assist the autonomous driving of the vehicle, and
    wherein the vehicle makes the request for the drone rental to the server to rent the drone depending on a determination result of the server.

2. The system of claim 1, wherein each of the at least one or more detectors includes at least one or more of a camera or a radar.

3. The system of claim 1, wherein the server determines whether communication with the drone of the vehicle is possible and whether an autonomous driving function is available, to determine drone service use permission, when receiving the request for the drone service use of the vehicle.

4. The system of claim 1, wherein the server transmits location information of the vehicle to the drone, when lending the drone.

5. The system of claim 4, wherein the drone moves to a location of the vehicle under control of the server.

6. The system of claim 1, wherein the drone includes:
    a communication device for wireless communication between the vehicle and the server;
    a Global Positioning System (GPS) receiver configured to detect location information of the drone;
    a gyro sensor configured to detect angle information of the at least one or more detectors; and
    a processor configured to correct the peripheral information detected by the at least one or more detectors, based on the location information of the drone and the angle information of the at least one or more detectors.

7. The system of claim 1, wherein the vehicle determines whether one of the at least one or more detectors mounted in the drone is abnormal and requests the server to lend another drone depending on the determination result of the vehicle.

8. The system of claim 1, wherein the vehicle determines whether to terminate the drone service use, in response to a user input when the autonomous driving is terminated.

9. The system of claim 8, wherein the vehicle makes a request for drone retrieval to the server, when it is determined that the drone service use is terminated.

10. The system of claim 9, wherein the server transmits a return location to the drone in response to the request for the drone retrieval of the vehicle.

11. A vehicle comprising:
    a communication device configured to wirelessly communicate with a server and a drone;
    a detector configured to detect vehicle state information; and
    a processor, which communicates with the communication device and the detector, configured to:
        make a request for drone service use to the server which is configured to determine whether the drone service use of the vehicle is possible,
        make a request for drone rental to the server to rent the drone depending on a determination result of the server,
        obtain peripheral information through at least one or more detectors mounted in the drone, and
        perform autonomous driving based on the obtained peripheral information and the vehicle state information,
    wherein the server determines whether the drone service use of the vehicle is possible in response to the request for the drone service use of the vehicle.

12. A method for assisting autonomous driving using a drone, the method comprising steps of:
    making, by a vehicle, a request for drone service use to a server;
    determining, by the server, whether the drone service use of the vehicle is possible;
    making, by the vehicle, a request for drone rental to the server depending on a determination result of the server;
    lending, by the server, a drone in response to the request of the vehicle;
    moving the drone to a location of the vehicle under control of the server; and
    performing, by the vehicle, autonomous driving based on peripheral information obtained through at least one or more detectors mounted in the drone.

13. The method of claim 12, wherein the at least one or more detectors of the drone includes at least one or more of a camera or a radar.

14. The method of claim 12, wherein the step of determining whether the drone service use of the vehicle is possible includes:
   determining whether the vehicle is capable of communicating with the drone and whether the vehicle has an autonomous driving function.

15. The method of claim 12, wherein the drone corrects information obtained by the at least one or more detectors based on location information of the drone and angle information of the at least one or more detectors, in the step of performing the autonomous driving.

16. The method of claim 12, wherein the vehicle determines whether the at least one or more detectors mounted in the drone are abnormal, in the step of performing the autonomous driving.

17. The method of claim 16, wherein the vehicle requests the server to lend another drone again at least one or more among the at least one or more detectors are abnormal, in the step of performing the autonomous driving.

18. The method of claim 12, further comprising:
   after the step of performing the autonomous driving,
   determining, by the vehicle, whether to terminate the autonomous driving;
   determining, by the vehicle, whether the drone service use is terminated, depending on whether the autonomous driving is terminated;
   making a request for drone retrieval to the server depending on whether the autonomous driving is terminated; and
   controlling, by the server, return of the drone.

19. The method of claim 18, wherein the server transmits return location to the drone, when the server causes the drone to return, in the step of controlling the return of the drone.

20. The method of claim 12, wherein the vehicle wirelessly communicates between the drone and the server.

* * * * *